United States Patent Office 3,814,604
Patented June 4, 1974

3,814,604
PHOTOIMAGING SYSTEMS BASED UPON PHOTO-SENSITIZED REARRANGEMENT OF N-VINYL-SULFONAMIDES TO β-SULFONYLVINYLAMINES
Walter R. Hertler, Kennett Square, Pa., assignor to E. I. du Pont de Nemours and Company, Wilmington, Del.
No Drawing. Filed Mar. 6, 1972, Ser. No. 232,224
Int. Cl. G03c 5/24, 1/00
U.S. Cl. 96—48 R                               9 Claims

ABSTRACT OF THE DISCLOSURE

A method for the imagewise conversion by light radiation, generally in the presence of photoinitiators, of N-vinylsulfonamides to β-sulfonylvinylamines, the latter yielding an image which is directly visible or subsequently developed to produce a clear image.

BACKGROUND OF THE INVENTION

Field of the invention

This invention relates to a process for forming photoimages by light-activated rearrangement of N-vinylsulfonamides to β-sulfonylvinylamines.

Description of the prior art

Numerous attempts have been made to obtain silverless photoimaging systems for the duplication or storage of information. In the search for a chain reaction system of transformation of one chemical species to another, it was observed that high energy ionizing radiation produces β-sulfonylvinylamines from N-vinylsulfonamides. Heat was also found to effect this change in the presence of the free-radical catalysts, azo initiators or peroxides; Stacey et al. J. Am. Chem. Soc., 81, 987–992 (1959) and U.S. Pat. 2,959,617. Although light can be used together with these azo catalysts, it is not an efficient means of effecting the transformation. The sulfonylvinylamines are stated to be useful as inhibitors for vinyl polymerization and as crosslinking agents for hydroxylated polymers such as polyvinyl alcohol.

DESCRIPTION OF THE INVENTION

It has now been found that a composition comprising an N-vinylsulfonamide and a free-radical generating system that absorbs light in the range of 200 to 8000 A. with a molar extinction coefficient of at least 100 in the range of 3300 to 8000 A., can be activated by light radiation to form a β-sulfonylvinylamine that yields an image which is visible or can be developed to produce a clear image. The reaction involved is

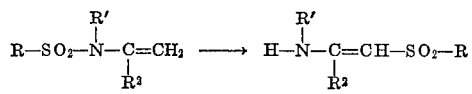

The N-vinylsulfonamide compound has the formula

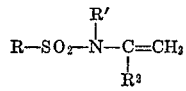

wherein

R, R', and R² are hydrocarbyl, halo- or hydrocarbyloxy-substituted hydrocarbyl of up to 12 carbon atoms in which any unsaturation is aromatic, with the provisos that
R' can be dialkylamino substituted hydrocarbyl;
R² can be hydrogen; and the sulfonamide has 4 to 30 carbons, up to 4 chlorine, fluorine, or bromine atoms and up to 1 ether oxygen.

The following sulfonamides can be prepared by procedures described in the examples or by known procedures as shown in J. Am. Chem. Soc. 81, 987 (1959), or J. Org. Chem. 20, 627 (1958). Illustrative compounds include:

N-ethyl-N-(m-chloro-α-styryl)-p-trichloromethylbenzene-sulfonamide,
N-propyl-N-2-propenyl-β-naphthalenesulfonamide,
N-methyl-N-vinyl-4-phenoxy benzenesulfonamide,
N-(p-chlorophenyl)N-p-butoxy-α-styryl)-2,5-dichloro-benzenesulfonamide,
N-methyl-N-(α-styryl)butanesulfonamide,
N-methyl-N-vinyl-β-naphthalenesulfonamide,
N-ethyl-N-(m-fluoro-α-styryl)-p-biphenylsulfonamide,
N-ethyl-N-(m-bromo-α-styryl)-p-bromobenzene sulfonamide,
N-ethyl-N-(p-bromo-α-styryl)-p-bromobenzenesulfonamide,
N-ethyl-N-(p-bromo-α-styryl)-p-fluorobenzenesulfonamide,
N-methyl-N-vinylmethanesulfonamide,
N-ethyl-N-(p-bromo-α-styryl)-3,5-dibromobenzene-sulfonamide,
N-ethyl-N-(m-fluoro-α-styryl)-p-trifluoromethyl-sulfonamide.

Preferred N-vinylsulfonamides from the point of view of high photospeed are those in which R is aromatic and R² is aromatic or aliphatic. Those preferred for obtaining directly a colored image are those in which R' is aromatic (especially p-methoxyphenyl and p-dimethylamino-phenyl).

The free-radical generating system absorbs light within the range of 2000 to 8000 A. and has at least one component that has an active light absorption band with a molar extinction coefficient of 100 or more within the range 3300 to 8000 A. "Active light absorption band" means a band of light which is active to produce the free radicals necessary to intiate the conversion of the sulfonamide. The free-radical generating system can comprise one or more compounds which directly furnish free radicals when activated by light. It can also comprise a plurality of compounds, one of which yields the free radicals after having been caused to do so by a sensitizer which is activated by the light.

A large number of such free-radical generating compounds can be utilized in the practice of the invention and include Michler's ketone (4,4'-bis(dimethylamino) benzophenone), 4,4'-bis(diethylamino)benzophenone, 4-hydroxy-4'-dimethylaminobenzophenone, 4-hydroxy-4'-diethylaminobenzophenone, 4 - acryloxy-4'-dimethylamino-benzophenone, 4-acryloxy-4'-diethylaminobenzophenone, 4-methoxy - 4' - dimethylaminobenzophenone, benzophenone, and other aromatic ketones; benzoin, benzoin ethers, e.g., benzoin methyl ether, benzoin ethyl ether, benzoin phenyl ether, methylbenzoin, ethylbenzoin; 2,4,5-triarylimidazole dimers such as 2-(o-chlorophenyl)-4,5-di-(m-methoxyphenyl)imidazole dimer, 2-(o-fluorophenyl)-4,5-diphenylimidazole dimer and the like disclosed in U.S. Pat. 3,479,185 and in British Pats. 997,396 published July 7, 1965 and 1,047,569 published Nov. 9, 1968. The U.S. patent also discloses unsubstituted aryl dimers and the first British patent discloses aryl dimers substituted with halogen and alkoxy having 1 to 5 carbon atoms. Accordingly, the dimers contemplated by this invention include the unsubstituted and substituted dimers.

The imidazole dimers may be used with compounds such as 2-mercaptobenzoxazole with or without sensitizers such as Michler's ketone and various dyes. Additional examples of suitable initiators are those disclosed in Plambeck U.S. Pat. 2,760,863 including vicinal ketonic compounds such as biacetyl, benzil, etc.; acyloins such as pivaloin, acetoin, etc.; alpha hydrocarbon substituted aromatic acyloins including alpha-methyl-benzoin, alpha- allylbenzoin and alpha-phenylbenzoin. Redox systems, especially those involving dyes, may also be used. These include Rose Bengal/2-dibutylaminoethanol and 2-o-chlorophenyl-3,4-di(m-methoxyphenyl)imidazole/2 - mercaptobenzoxazole, etc.

A preferred group of free-radical generating systems characterized by generally good efficiency comprises;

benzoin ethers such as methyl, ethyl and phenyl;
methyl benzoin and its ethers such as α-methylbenzoin methyl ether;
Michler's ketone and its analogs;
benzophenone (with and without hexanediol);
2,4,5-triarylimidazole dimers plus 2-mercaptobenzoxazole (with or without perylene and other sensitizers);
2,4,5-triarylimidazole dimers plus Michler's ketone;
biacetyl.

A more preferred group comprises:

benzoin ether-methyl, ethyl and phenyl;
methyl benzoin and its ethers (which exhibit very high efficiency), 2,4,5-triarylimidazole dimers with 2-mercaptobenzoxazole plus Michler's ketone.

The N-vinylsulfonamide in the presence of a suitable activating free-radical is rearranged, as previously noted, by a chain reaction to the corresponding β-sulfonylvinylamine, i.e.,

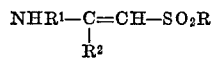

Since this rearrangement proceeds by a chain reaction, a large number of vinylamine molecules, e.g., 800 or more, may be produced for each vinylsulfonamide molecule activated initially by a photolytically formed free-radical.

The N-vinylsulfonamides with photosensitizer are applied to a suitable substrate for the preparation of a carrier for exposure and observation of the resultant transformation to corresponding amines. Although the mixture can be used as a solid crystalline material and applied to a substrate without adjuvants or diluents, it is generally preferred that for homogeneous coatings, binders such as cellulose acetate, cellulose acetate hydrogen phthalate, polyvinyl alcohol, gelatin, or polymeric acrylates and methacrylates be employed to give uniform films on dimensionally stable supports. The supports can be rigid or flexible and include sheets, foils or films of glass, metals, paper, vinyl or condensation polymers (especially of oriented polyethylene terephthalate) and the like.

The combination of dimensionally stable support with vinylsulfonamide and photoactivator is prepared and stored in the absence of substantial amounts of activating radiation.

Thickness of the photosensitive layer can vary widely. Generally preferred is a thickness of a few microns when the vinylsulfonamide and photoactivator are employed as a solid layer, and a thickness of 1 to 300 mils when dispersed in a binder or solid diluent.

The compositions of this invention are exposed to light of wavelength in the 2000–8000 A. range to form images. Suitable sources of light are sunlight, carbon arc light, mercury vapor lights, fluorescent lights having ultraviolet emitting phosphors, electronic flash units, cathode ray tube, etc.

The ratio of N-vinylsulfonamide to photoactivator can vary within wide limits. The latter can be present on a weight basis of from about 0.1% to 150% of the weight of the N-vinylsulfonamide.

Imagewise exposure, for example in preparing printed circuits, is conveniently carried out by exposing a layer of the photoactive composition to light through a process transparency, e.g., a process negative or positive (an image-bearing transparency consisting solely of substantially opaque areas are substantially of the same optical density, the so-called line or halftone negative or positive). Many of the systems of this invention reproduce continuous tone transparencies such as negative or positive transparencies of the type obtained by standard silver halide photography.

The image obtained by photolytic conversion of a sulfonamide to amine is directly readable in some cases when the R and R² groups are aromatic since the transformation produces a marked change in the light scattering or opacity of the layer. Where R' is aromatic the image is directly readable by a color change. For most purposes, advantage can be taken of the chemical change to an amine to develop or intensify the image even further. The developers are compounds which precipitate or form salts with the products of photorearrangement. Suitable developing agents are polyhedral borane carbonyls and borohydrides, such as $B_{12}H_{10}(CO)_2,(CH_3)_2SB_{10}H_8CO$, $B_{12}H_{12} \cdot 2H_3O$, and acids such as sulfuric acid, methanesulfonic acid, hydrochloric acid, picric acid, 2,4-dinitrobenzenesulfonic acid and p-phenylazobenzenesulfonic acid. As shown in the Examples, further treatment of the exposed portion can precipitate metals such as the noble metals on which other conductive metals can be plated. The latter technique can be used to provide metal deposition in printed circuit configurations.

SPECIFIC EMBODIMENTS OF THE INVENTION

The following are non-limitative examples in which all parts and percentages are by weight unless otherwise stated.

Example 1

A stock solution was prepared by dissolving 200 mg. of N-methyl-N-(α-styryl)-p-toluenesulfonamide and 200 mg. of benzoin methyl ether in 8 ml. of a 5% solution of cellulose acetate butyrate in acetone. One ml. of stock solution was coated on a 2.5 x 8 cm. glass microscope slide. After evaporation of the solvent the coating was exposed in a nitrogen atmosphere through a negative using a medium pressure mercury lamp (20 μw./cm.² below 4200 A.) for 60 sec. The exposed coating was placed in an ether solution of $(CH_3)_3NB_{10}H_8CO$, and a white image appeared in the light-struck regions, unexposed areas becoming transparent. After rinsing in ether and drying, the white and clear regions interchanged giving a reverse image.

When a similar exposure was carried out in air, no image was observed.

Example 2

In each of the wells of a porcelain spot test plate was placed a drop of the stock solution from Example 1. After drying, the plate was exposed imagewise under nitrogen for 60 sec. to the mercury lamp of Example 1. The wells were then treated briefly with a solution of $(CH_3)_2NHB_{10}H_8CO$ in ether and rinsed twice with ether. Then a solution of palladium chloride in a mixture of dilute hydrochloric acid and acetone was added and palladium metal precipitated. After rinsing with aqueous acetone, it was apparent that the metallic palladium formed in the exposed wells was much denser than the palladium formed in the unexposed wells. Apparently some fog was produced by incomplete rinsing of

from the unexposed wells. Addition of an electroless copper plating solution (Enplate CU 400A from Enthone, Inc.) gave a metallic copper plating.

Example 3

Stock solution of Example 1 was placed in four of the wells of a porcelain spot test plate and dried under nitrogen. Two of the wells were covered and two were exposed under nitrogen for 60 sec. to the mercury lamp of Example 1. One exposed and one unexposed well were treated with aqueous acetone and two drops of a solution of Alizarin in methanol. One exposed and one unexposed well were treated with aqueous acetone and two drops of aqueous Bromthymol Blue. On heating, the material in the exposed wells turned color. The alizar-intreated well went from yellow-orange to red and the Bromthymol Blue-treated well changed from yellow to deep blue. The unexposed wells did not change color.

Example 4

The stock solution of Example 1 was coated on a glass microscope slide and exposed under nitrogen for 2 min. through a Kodak 1A step tablet (11 steps) to the mercury lamp of Example 1. The exposed plate was placed in an ether solution of $B_{12}H_{10}(CO)_2$ and an image formed. Four steps were visible in the image corresponding to a sensitivity to $\sim 100\mu j./cm.^2$ (below 4200A.) after correcting for light absorption by Mylar® film used in conjunction with the step tablet.

Examples 5–10 are reactions using various starting sulfonamides, which reactions can be used in image formations according to the invention.

Example 5

A solution of 1-methylamino-1-vinyl-2 - p - toluenesulfonylethylene in acetone was treated with a solution of 7,7,8,8-tetracyanoquinodimethan (TCNQ). No change was observed initially but after an hour the solution had become deep green. In a similar experiment using N-methyl-N-(α-styryl)-p-toluenesulfonamide in acetone with TCNQ no color change was observed. Thus, TCNQ can be used as a reagent for detection of the product of photorearrangement of N-methyl-N-(α-styryl) - p - toluenesulfonamide.

Example 6

A stock solution was prepared by dissolving 5.4 mg. of Michler's ketone and 1.82 g. of benzophenone in 100 ml. of benzene. In 0.25 ml. of this stock solution was dissolved 150 mg. of N-methyl-N(α-styryl)-p-toluenesulfonamide. The resulting solution was placed in a 1 cm. Pyrex cell, purged with nitrogen, sealed and exposed for 3 hours at 366 m$\mu$ ($\sim$100 $\mu$w./cm.$^2$). Analysis of the solution by NMR shows that 47% of the starting material rearranged to 1 - methylamino - 1 - vinyl-2-p-toluenesulfonylethylene.

Example 7

A solution of 150 mg. of N-methyl-N-(α-styryl)-p-toluenesulfonamide and 1 mg. of 2-o-chlorophenyl-4,5-di(m-methoxyphenyl)imidazole dimer in 0.25 ml. of benzene was placed in a 1 cm. Pyrex cell, purged with nitrogen and exposed for 2 hours at 366 m$\mu$ ($\sim$100 $\mu$w./cm.$^2$). Analysis of the solution by NMR shows that 11% of the vinyl sulfonamide rearranged to 1-methylamino-1-vinyl-2-p-toluenesulfonylethylene.

Example 8

A stock solution was prepared by dissolving 20 mg. of 2-o-chlorophenyl-4,5-di(m - methoxyphenyl)imidazole dimer and 2 mg. of 2-mercaptobenzoxazole in 20 ml. of benzene. In 0.25 ml. of this stock solution was dissolved 150 mg. of N-methyl-N-(α-styryl)-p-toluenesulfonamide. The resulting solution was placed in a 1 cm. Pyrex cell, purged with nitrogen and exposed for 2 hours at 366 m$\mu$ ($\sim$100 $\mu$w./cm.$^2$). Analysis of the solution by NMR shows that 60% of the vinyl sulfonamide was converted to 1-methylamino-1-phenyl-2-p-toluenesulfonylethylene.

Example 9

The procedure of Example 8 was followed except that the exposure was carried out in the presence of air. Analysis of the exposed solution by NMR showed that 20% of the vinyl sulfonamide was converted to 1-methylamino-1-phenyl-2-p-toluenesulfonylethylene.

Example 10

A stock solution was prepared by dissolving 1.82 g. of benzophenone in 75 ml. of benzene and 25 ml. isopropanol. In 0.25 ml. of this stock solution was dissolved 150 mg. of N-methyl-N-(α-styryl)-p-toluenesulfonamide. The resulting solution was placed in a 1 cm. Pyrex cell, purged with nitrogen and exposed for 2 hours at 366 m$\mu$ ($\sim$100 $\mu$w./cm.$^2$). After removal of most of the solvent, in vacuo, the residue was analyzed by NMR and found to contain 27% of 1-methylamino-1-phenyl-2-p-toluenesulfonylethyl and 73% unchanged N-methyl-N-(α-styryl)-p-toluenesulfonamide.

Example 11

A solution of 200 mg. of N-methyl-N-(α-styryl)-p-toluenesulfonamide and 100 mg. benzoin methyl ether in 0.5 ml. of a 5% solution of cellulose acetate butyrate in acetone was coated on a 18 x 18 mm. piece of thin glass. After the solvent had evaporated the thick viscous coating was exposed in air imagewise for 60 sec. at 366 m$\mu$ ($\sim$100 $\mu$w./cm.$^2$) and then placed in an ether solution of $B_{12}H_{10}(CO)_2$. A precipitate appeared in the exposed region but not in the unexposed region.

Example 12

A solution was prepared by dissolving 100 mg. of N-methyl-N-(α-styryl) - p - toluenesulfonamide, 80 mg. of ethyl p-toluenesulfonate (plasticizer), 10 mg. of 2-o-chlorophenyl-4,5-di(m - methoxyphenyl)imidazole dimer, 10 mg. Michler's ketone and 1 mg. of 2-mercaptobenzoxazole in 2 ml. of a 5% solution of cellulose acetate butyrate in acetone. The resulting solution was coated on a glass microscope slide. After the solvent had evaporated the coating was exposed imagewise under nitrogen for 2 minutes to the mercury lamp of Example 1. The exposed slide was then placed in a solution of $B_{12}H_{10}(CO)_2$ in ether. A negative scatter image formed in the coating. The film was then rinsed with ether and a permanent image remained.

Example 13

A solution was prepared by dissolving 50 mg. of N-methyl-N-(α-styryl)-p-bromobenzenesulfonamide and 50 mg. of benzoin methyl ether in 1 ml. of 5% solution of cellulose acetate butyrate in acetone. The resulting solution was coated on a microscope slide and allowed to dry. The coating was exposed through a transparency in a nitrogen atmosphere for 120 sec. to the mercury lamp of Example 1. The coating contained a faint negative image. Upon immersing the coating in a dilute solution of $B_{12}H_{10}(CO)_2$ in ether a very intense negative image formed instantaneously. The coating was then rinsed with ether. One half of the coating was dipped in a dilute aqueous solution of palladium chloride. Metallic palladium precipitated in the exposed regions. After rinsing well with water, the coating was dipped in a copper plating bath described in Example 2. After rinsing with water it contained a dense silvery copper image.

The N-methyl-N-(α-styryl)-p-bromobenzenesulfonamide used in this example was prepared as follows:

To a slurry of 345 ml. of anhydrous dimethylformamide and 11.5 g. of a 50% dispersion of sodium hydride in mineral oil was added 55.4 g. of N-methyl-p-bromobenzenesulfonamide. The mixture was stirred for 2 hours at which time the hydrogen evolution had ceased, and the mixture was then cooled in an ice bath to 10° and treated with 50.8 g. of methyl-α-bromophenyl acetate. The mixture was stirred at room temperature for 1 hour. The resulting solution was poured into ice water and extracted twice with benzene. The benzene extracts were combined and washed twice with water, once with 1% aqueous sodium hydroxide, and twice with water. The benzene solution was dried over Drierite® and evaporated in vacuo to give 72.3 g. of oil. Cooling while scratching with hexane caused crystallization to occur. Filtration gave 55.9 g. of solid. Recrystallization from ether-hexane gave 33.8 g. of crystals of N-methyl-N-(α-carbomethoxybenzyl)-p-bromobenzenesulfonamide, M.P. 94.5–97.5°. An additional recrystallization raised the M.P. to 98–100°.

*Analysis.*—Calcd. for $C_{16}H_{16}NSBrO_4$: C, 48.1; H, 4.05; N, 3.52. Found: C, 47.6, 47.8; H, 3.96, 4.09; N, 3.39, 3.30.

To a stirred slurry of 1.85 g. of lithium aluminum hydride and 125 ml. of tetrahydrofuran cooled in an ice bath was added a solution of 33 g. of N-methyl-N-(α-carbomethoxybenzyl)-p-bromobenzenesulfonamide in 83 ml. of tetrahydrofuran at a rate such that the temperature remained near 28°. The mixture was stirred at room temperature for 1.25 hours, treated with an additional 0.2 g. of lithium aluminum hydride, and stirred for .75 hour. The mixture was cooled, treated with 15 ml. of water and stirred for 30 min. The mixture was filtered and the filtrate was evaporated *in vacuo* to 27.2 g. of oil. This residue was treated with 50 ml. of 10% sodium hydroxide and sufficient ethanol to give a homogeneous solution at the reflux. After refluxing for 1 hour the mixture was concentrated *in vacuo* to remove ethanol and was then treated with water and ether. The ether extract was washed twice with water, dried and evaporated to 16.5 g. of N-methyl-N - [α - (hydroxymethyl)benzyl]-p-bromobenzenesulfonamide as a viscous oil which could not readily be crystallized.

To a stirred solution of 18 g. of p-toluenesulfonyl chloride in 80 ml. of pyridine was added dropwise with warming a solution of 16.5 g. of N-methyl-N-[α-(hydroxymethyl)benzyl]-p-bromobenzensulfonamide in 60 ml. of pyridine over a period of 15 min. The temperature was maintained at about 40° during the addition. The resulting solution was stirred overnight at room temperature, cooled to 10° and treated with a few pieces of ice. After 15 min. the solution was poured into a mixture of ice and hydrochloric acid. The resulting gummy precipitate was collected by filtration, dissolved in benzene, washed twice with water, dried over Drierite®, and evaporated *in vacuo* to 25.6 g. of N-methyl-N-(α-phenyl-β-p-toluenesulfonoxyethyl)-p-bromobenzenesulfonamide as a viscous oil.

A mixture of 25.6 g. of N-methyl-N-(α-phenyl-β-p-toluenesulfonoxyethyl) - p - bromobenzenesulfonamide, 115 ml. of ethanol and 13 g. of potassium hydroxide was stirred for 2 hours at reflux under nitrogen. The mixture was cooled and diluted with ice water. The resulting gummy precipitate was extracted with ether-hexane. The extract was washed twice with water, dried and evaporated to 14 g. of oil. Recrystallization from methanol gave 8.66 g. of crystals of N-methyl-N-(α-styryl)-p-bromobenzenesulfonamide, M.P. 73.5–76°. A second recrystallization from methanol raised the M.P. to 76.5–78°. The N.M.R. spectrum of the product is consistent with the assigned structure.

*Analysis.*—Calcd. for $C_{15}H_{14}NSO_2Br$: C, 51.1; H, 4.00; N, 4.00; Br, 22.7. Found: C, 50.7; H, 3.96; N, 3.78; Br, 22.0.

Example 14

A solution was prepared by dissolving 100 mg. of N - methyl - N - (p-bromo-α-styryl)-p-toluenesulfonamide and 150 mg. of benzoin methyl ether in 3 ml. of a 5% solution of cellulose acetate butyrate in acetone. One ml. of the resulting solution was coated on a microscope slide and allowed to dry. The coating was exposed in a nitrogen atmosphere for 120 sec. to the mercury lamp of Example 2 through a negative transparency. The coated slide was then dipped in an ethereal solution of $B_{12}H_{10}(CO)_2$ and a negative image immediately appeared. A similar coated slide was exposed in air to the same light source for 5 min. and developed in the same way to give a weak image.

The N - methyl-N-(p-bromo-α-styryl)-p-toluenesulfonamine was prepared in the following way:

A solution of 87 g. of p-bromophenylacetyl chloride (prepared by the reaction of thionyl chloride with p-bromophenylacetic acid), 200 ml. of carbon tetrachloride and 19.1 ml. of bromine was stirred at reflux for 2 days until the bromine color was discharged. The solution was cooled, treated with 19.1 ml. of methanol and refluxed for 1 hour. The solvent was evaporated, and the residue was distilled to give 62.8 g. of methyl α-p-dibromophenylacetate, B.P. 103°/.5 mm. to 110°/1.5 mm. The N.M.R. spectrum of the product is consistent with the assigned structure.

A slurry of 320 ml. of anhydrous dimethylformamide and 10.6 g. of a 50% dispersion of sodium hydride in mineral oil was treated with 37.7 g. of N-methyl-p-toluenesulfonamide and stirred for 1.5 hours. The solution was then cooled in an ice bath and treated with 62.8 g. of methyl α-p-dibromophenylacetate. The resulting mixture was stirred for 1 hour at room temperature, poured into ice water, and extracted twice with benzene. The benzene extracts were combined and washed twice with water, once with 1% aqueous sodium hydroxide, twice with water, dried and evaporated *in vacuo* to 68.8 g. of crude N-methyl - N - [α-(carbomethoxy)-p-bromobenzyl]-p-toluenesulfonamide as an oil. The oil was rinsed with hexane and from the hexane rinse there was obtained crystals which upon recrystallization from methanol gave N-methyl-N-[α - (carbomethoxy) - p - bromobenzyl]-p-toluenesulfonamide, M.P. 112.5–113.5°.

*Analysis.*—Calcd. for $C_{17}H_{18}NSBrO_4$: C, 49.5; H, 4.40; N, 3.40. Found: C, 49.6; H, 4.56; N, 3.38.

To a slurry of 6 g. of lithium aluminum hydride in 400 ml. of tetrahydrofuran cooled in an ice bath at 10° was added a solution of 68 g. of crude N-methyl-N-[α-(carbomethoxy)-p-bromobenzyl]-p-toluenesulfonamide in 200 ml. of tetrahydrofuran at such a rate that the temperature did not exceed 35°. After stirring for 2 hours at room temperature the mixture was cooled, treated with 35 ml. of water, stirred for 30 min. and filtered. The filtrate was evaporated *in vacuo*, and the residual oil was treated at reflux for 45 min. with 75 ml. of 10% aqueous sodium hydroxide and 250 ml. of ethanol. The ethanol was removed *in vacuo* and the residue was treated with water and ether and filtered. The ether layer was treated with a small amount of chloroform, washed twice with water, dried with Drierite® and evaporated to 45.4 g. of a mixture of oil and crystals. The mixture was treated with about 150 ml. of ether and filtered to remove insoluble crystalline material. The filtrate was evaporated to 39.6 g. of oil. The oil was rinsed 3 times with cold hexane, dissolved in a small volume of ether and evaporated to 35.3 g. of oil. This oil was dissolved in benzene and poured onto a chromatographic column of 500 g. of neutral alumina packed in benzene. After elution with three 1. of benzene, three 1. of 1:9 ether-benzene, 2.25 1. of 2:8 ether-benzene, 2.25 1. of 1:1 ether-benzene, 6.75 1. of ether, 6.75 1. of 9:1 ether-chloroform and 750 ml. of 10:1 ether-methanol, elution with an additional 750 ml. of 10:1 ether-methanol gave 16.5 g. of N-methyl-N-[α-(hydroxymethyl)-p-bromobenzyl]-p-toluenesulfonamide as an oil. The N.M.R. spectrum of the product is consistent with the assigned structure.

To a warm stirred solution of 18 g. of p-toluenesulfonyl chloride in 80 ml. of pyridine was added dropwise over a period of 15 min. a solution of 16.5 g. of N-methyl-N-[α-(hydroxymethyl)-p-bromobenzyl] - p - toluenesulfonamide in 70 ml. of pyridine, maintaining the temperature at 40°. The solution was allowed to stand at room temperature overnight and was cooled in an ice bath to 10° and treated with a few pieces of ice. After 10 min., the solution was poured into a mixture of ice and hydrochloric acid and filtered. The gummy filter cake was dissolved in ether, washed twice with water, and dried *in vacuo* to 20.7 g. of N-methyl-N-[α-(p-bromophenyl)-β-(p-toluenesulfonoxyethyl)]-p-toluenesulfonamide as an amber oil.

A mixture of 20.7 g. of N-methyl-N-[α-(p-bromophenyl)-β-(p - toluenesulfonoxyethyl)]-p-toluenesulfonamide, 125 ml. of ethanol and 13 g. of potassium hydroxide was stirred at reflux for 2 hours, cooled, treated with water and filtered. The filter cake (11.5 g.) was recrystallized from methanol to give 6.7 g. of N-methyl-N-(p-bromo-α-styryl)-p-toluenesulfonamide, M.P. 105–108.5°. An additional recrystallization from methanol raised the M.P. to 108–109°. The N.M.R. spectrum is consistent with the assigned structure.

Analysis.—Calcd. for $C_{15}H_{16}NSO_2Br$: C, 52.4; H, 4.40; N, 3.83; Br, 21.8. Found: C, 52.2; H, 4.15; N, 3.78; Br, 21.1.

Example 15

A solution was prepared by dissolving 100 mg. of N-methyl-N-(p-methoxy-α-styryl)-p-toluenesulfonamide and 100 mg. of benzoin methyl ether in 2 ml. of a 5% solution of cellulose acetate butyrate in acetone. One ml. of the solution was coated on a glass microscope slide and the solvent was allowed to evaporate. The coating was exposed through a transparency in a nitrogen atmosphere for 5 min. to the mercury lamp of Example 1 and then placed in a dilute solution of $B_{12}H_{10}(CO)_2$ in ether. An image appeared. After rinsing in ether the light-struck regions of the coating contained the yellow color of the original coating and the non-light struck regions were clear and colorless.

The N-methyl-N-(p-methoxy-α-styryl)-p-toluenesulfonamide was prepared as follows:

Methyl-α-bromo-p-methoxyphenyl acetate was prepared by reaction of thionyl bromide with methyl-α-hydroxy-p-methoxyphenyl acetate. A mixture of 300 ml. of anhydrous dimethylformamide, 7.5 g. of a 50% dispersion of sodium hydride in mineral oil and 28.9 g. of N-methyl-p-toluenesulfonamide was treated with 25 ml. of ether and stirred at 35° until all of the sodium hydride had reacted. The mixture was cooled to 10° and treated with 40.4 g. of methyl α-bromo-p-methoxyphenyl acetate. An additional 1 g. of 50% sodium hydride dispersed in mineral oil was added. After stirring for 1 hour at room temperature, the mixture was treated with 20 ml. of methanol, poured into ice water and extracted with ether. Some solid insoluble material was removed by filtration. The ether extract was washed twice with water, once with 1% aqueous sodium hydroxide, once with water, dried and evaporated in vacuo to an oil. This residual oil was cooled and rinsed 3 times with cold hexane to give 23.6 g. of N-methyl-N-(α-carbomethoxy-p-methoxybenzyl) - p - toluenesulfonamide. An analytical sample was prepared by recrystallization from ether of some of the insoluble solid material obtained during the ether extractions to give crystals of N-methyl-N-(α - carbomethoxy - p - methoxybenzyl)-p-toluenesulfonamide, M.P. 104.5–105.5°.

Analysis.—Calcd. for $C_{18}H_{21}NSO_5$: C, 59.6; H, 5.82; N, 3.86. Found: C. 59.5; H, 5.79; N, 3.79.

To a stirred slurry of 3 g. of lithium aluminum hydride in 200 ml. of ether was added with stirring a solution of 22 g. of N-methyl-N-(α-carbomethoxy-p-methoxybenzyl)-p-toluenesulfonamide in 200 ml. of ether. The mixture was stirred at room temperature for an hour, cooled, treated with 20 ml. of water and then with dilute hydrochloric acid until all solids had dissolved. The layers were separated and the ether layer was washed with water, dried and evaporated to 9.7 g. of N-methyl-N-[α-(hydroxymethyl)-p-methoxybenzyl] - p - toluenesulfonamide as an oil.

To a solution of 9.7 g. of N-methyl-N-[α-(hydroxymethyl)-p-methoxybenzyl]-p-toluenesulfonamide in 60 ml. of anhydrous pyridine was added a solution of 15 g. of p-toluenesulfonyl chloride in 40 ml. of anhydrous pyridine. The solution was warmed to 45° and then allowed to stand at room temperature overnight. The solution was cooled in an ice bath and treated with a few pieces of ice. After 20 min., the solution was poured into a mixture of ice in conc. hydrochloric acid. The gummy pricipitate was collected by filtration, dissolved in benzene, washed with water, dried and evaporated in vacuo to 10.4 g. of N-methyl - N - [α-(p-toluenesulfonoxyethyl)-p-methoxybenzyl]-p-toluenesulfonamide as an oil.

A mixture of 10.4 g. of N-methyl-N-[α(p-toluenesulfonoxyethyl)-p-methoxybenzyl] - p - toluenesulfonamide, 7 g. of potassium hydroxide and 70 ml. of ethanol was stirred at reflux for 3.25 hours, cooled, diluted with ice water and extracted with etherhexane. The extract, was washed 3 times with water, dried and evaporated to a red oil. The residual oil was dissolved in ether, filtered through basic alumina and evaporated to an orange oil which crystallized on scratching at −80° with ether and hexane. The product was recrystallized from methanol, dissolved in benzene-ether, filtered through basic alumina and after removal of solvent again crystallized from methanol to give 750.6 mg. of orange crystals of N-methyl-N-(p-methoxy-α-styryl) - p - toluenesulfonamide, M.P. 79–81°. Recrystallization from ether-hexane gave yellow crystals of the same compound, M.P. 79–82°.

Analysis.—Calcd. for $C_{17}H_{19}NSO_3$: C, 64.5; H, 6.04; N, 4.42. Found: C, 64.5; H, 6.37; N, 4.27. The N.M.R. spectrum of the product is in agreement with the assigned structure.

Example 16

A solution was prepared by dissolving 100 mg. of N-methyl-N-vinyl-p-methoxybenzenesulfonamide and 100 mg. of benzoin methyl ether in 2 ml. of a 5% solution of cellulose acetate butyrate in acetone. One ml. of the solution was coated on a microscope slide, dried and exposed imagewise in a nitrogen atmosphere for 18 min. to a 4.5 amp carbon arc lamp through a pyrex and water filter. After bathing the coating in dilute ethereal $B_{12}H_{10}(CO)_2$ a relief image appeared with good resolution. The N-methyl-N-vinyl-p-methoxybenzenesulfonamide used in this example was prepared by the reaction of acetylene and N-methyl-p-methoxybenzenesulfonamide in benzene solution in the presence of powdered potassium hydroxide using the procedure of T. L. Cairns and J. C. Sauer, J. Org. Chem., 20, 627 (1955).

Example 17

A solution was prepared by dissolving 100 mg. of N-p-methoxyphenyl-N-α-styryl - p - toluenesulfonamide and 100 mg. of benzoin methyl ether in 2 ml. of a 5% solution of cellulose acetate butyrate in acetone. One ml. of the solution was coated on a microscope slide and allowed to dry. The coating was exposed under a nitrogen atmosphere for 5 min. to a 4.5 amp carbon arc lamp through a transparency. The original colorless film had become yellow in the light-struck areas giving a yellow image. On dipping the coating in an ethereal solution of

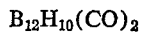

$B_{12}H_{10}(CO)_2$ the image intensified somewhat and clearified. The image was projected onto a light screen by means of a lamp.

The N - p - methoxyphenyl-N-α-styryl-p-toluenesulfonamide was prepared by the following method:

To 300 ml. of anhydrous dimethylformamide was added 43.5 g. of N-p-methoxyphenyl-p-toluenesulfonamide (prepared by the reaction of p-toluenesulfonyl chloride and p-anisidine), 7.7 g. of a 50% dispersion of sodium hydride in mineral oil and 35.9 g. of methyl α-bromophenylacetate. After stirring for 2 hours at room temperature the mixture was poured into water and extracted with ether. The ether extract was washed with water and evaporated to an oil. The oil was extracted with ether, again, washed with water, dried and evaporated to 58.6 g. of a gum, the N.M.R. spectrum of which shows to be substantially N-p-methoxyphenyl - N - [α - (carbomethoxy)benzyl]-p-toluenesulfonamide.

To a stirred slurry of 4 g. of lithium aluminum hydride in 250 ml. of ether was added dropwise a solution of 58.6 g. of N-p-methoxyphenyl-N-[α - (carbomethoxy)benzyl]- p-toluenesulfonamide in 165 ml. of ether. The mixture was treated with water and dilute hydrochloric acid and filtered. The filtrate was evaporated to an oil which was stirred at reflux for 1 hour with 50 ml. of 10% aqueous sodium hydroxide and sufficient ethanol to give a homogeneous solution. The mixture was diluted with water and extracted with ether. The ether extract was washed 3 times with water, dried, and evaporated to 24.4 g. of oil the N.M.R. of which shows to be predominantly N-p-methoxyphenyl - N - [α-(hydroxymethyl)benzyl] - p - toluenesulfonamide.

To a solution of 24.4 g. of N-p-methoxyphenyl-N-[α-(hydroxymethyl)benzyl-p - toluenesulfonamide in 75 ml. of pyridine at 45° was added dropwise a solution of 24 g. of p-toluenesulfonyl chloride in 60 ml. of pyridine maintaining the temperature at 40–45°. After standing overnight at room temperature the mixture was cooled, treated with a few pieces of ice and, after 30 min., poured into a mixture of ice and hydrochloric acid. The precipitated solid was collected by filtration, but the filter cake turned to an oil so it was dissolved in benzene, washed 3 times with water, dried, and evaporated in vacuo to 39.1 g. of an oil the N.M.R. spectrum of which shows to be mostly N-p-methoxyphenyl-N-[α - (p-toluenesulfonoxymethyl)-benzyl]-p-toluenesulfonamide.

A mixture of 39.1 g. of N-p-methoxyphenyl-N-[α-(p-toluenesulfonoxymethyl)benzyl] - p - toluenesulfonamide, 24 g. of potassium hydroxide and 240 ml. of ethanol was stirred at reflux for 4 hours, cooled and diluted with water. The oily product was extracted with hexane-ether, washed with water, dried and evaporated to 21.3 g. of oil. Recrystallization twice from ethanol gave 11.1 g. of N- p - methoxyphenyl-N-α-styryl - p - toluenesulfonamide, M.P. 78–81°.

Analysis.—Calcd. for $C_{22}H_{21}NO_3S$; C, 69.6; H, 5.56; N, 3.69. Found: C, 69.8; H, 5.60; N, 3.60. The N.M.R. spectrum of the product is consistent with the assigned structure.

Example 18

A solution was prepared by dissolving 100 mg. of N-methyl-N-vinyl - p - toluenesulfonamide and 100 mg. of benzoin methyl ether in 2 ml. of a 5% solution of cellulose acetate butyrate in acetone. One ml. of the solution was coated on a glass microscope slide, dried and exposed in a nitrogen atmosphere through a negative for 5 min. to a 4.5 amp carbon arc lamp. After immersing in a dilute solution of $B_{12}H_{10}(CO)_2$ in ether a relief image formed.

Example 19

A solution was prepared by dissolving approximately 100 mg. of N - methyl-N-vinyl-p-methoxybenzenesulfonamide and approximately 100 mg. of benzoin methyl ether in 3 ml. of a 5% solution of cellulose acetate butyrate in acetone. One ml. of the resulting solution was coated on a microscope slide, dried and exposed imagewise for 5 min. under nitrogen to a 4.5 amp carbon arc lamp. The coating was dipped in a solution of p-toluenesulfonic acid in ether, and an image quickly appeared. After rinsing with ether and drying, the film contained an image which was an opaque white in the unexposed areas.

Example 20

A solution was prepared by dissolving 100 mg. of N-methyl-N-vinyl-p-toluenesulfonamide and 100 mg. of benzoin methyl ether in 3 ml. of a 5% solution of cellulose acetate butyrate in acetone. One ml. of the solution was coated on a microscope slide, dried, and exposed under nitrogen for 3 min. through a transparency to a 4.5 amp carbon arc lamp at a distance of 14.5 inches. The coating was bathed in ethereal p-toluenesulfonic acid and rinsed with ether to give a positive light-scattering image. When the image-containing film was peeled from the glass substrate, a weak image remained on the glass.

Example 21

A solution was prepared by dissolving 100 mg. of N-p-methoxyphenyl-N-α-styryl-p-toluenesulfonamide and 100 mg. of benzoin methyl ether in 3 ml. of a 5% solution of cellulose acetate butyrate in acetone. One ml. of the solution was coated on a microscope slide, dried, and exposed under nitrogen for 1 min. through a transparency to a 4.5 amp carbon arc lamp at a distance of 14.5 inches. A yellow negative image was obtained. On dipping the exposed coating in an ether solution of p-toluenesulfonic acid, light-scattering properties were added to the yellow image.

Example 22

A solution was prepared by dissolving 50 mg. of N-methyl-N-vinyl-p - methoxybenzenesulfonamide and 50 mg. of benzoin methyl ether in 3 ml. of a 5% solution of cellulose acetate butyrate in acetone. One ml. of the solution was coated on a microscope slide, dried, and exposed imagewise for 3 min. under nitrogen to a 4.5 amp carbon arc lamp at a distance of 14.5 inches. The coating was immersed in a solution of picric acid in ether and then rinsed with ether to give a bright yellow negative image.

Example 23

A solution, prepared by dissolving 50 mg. of benzoin methyl ether and 50 mg. of N-p-methoxyphenyl-N-α-styryl-p-toluenesulfonamide in 1.5 ml. of a 5% solution of cellulose acetate butyrate in acetone, was coated on a microscope slide, dried, and exposed in air for 5 min. through a transparency to a 4.5 amp carbon arc lamp at a distance of 14.5 inches. After exposure, the film had a pale yellow negative image. After immersion in a solution of picric acid in ether the yellow image had intensified considerably. The image was projected onto a light screen by means of a lamp.

Example 24

A solution was prepared by dissolving 50 mg. of N-methyl - N-(α - styryl-p-methoxybenzenesulfonamide and 50 mg. of benzoin methyl ether in 3 ml. of a 5% solution of cellulose acetate butyrate in acetone. One ml. of the resulting solution was coated on a microscope slide and allowed to dry. The coating was exposed under a nitrogen atmosphere through a transparency for 3.5 min. at 366 mμ ($7\mu w/cm^2$). The coating was then immersed in a solution of picric acid in ether, and rinsed with ether to give a yellow negative image.

The N-methyl-N-(α - styryl)-p-methoxybenzenesulfonamide was prepared by the following method:

To a stirred slurry of 350 ml. of anhydrous dimethylformamide and 11.5 g. of 50% sodium hydride dispersed in mineral oil was added 42 g. of N-methyl-p-methoxybenzenesulfonamide. After stirring for 1 hour at ambient temperature, the mixture was cooled to 10° and treated with 48.2 g. of methyl α-bromophenyl acetate. The mixture was stirred for one hour at ambient temperature, poured into ice water and extracted with 600 ml. of benzene. The benzene extract was washed with water, 1% aqueous sodium hydroxide, twice with water, dried and evaporated in vacuo to 54.1 g. of oil, which crystallized on scratching with a mixture of ether and hexane. Recrystallization from methanol gave 17.4 g. of crystals of N-methyl-N-[α-(carbomethoxy)benzyl] - p - methoxybenzenesulfonamide, M.P. 105–108°. A second recrystallization from methanol gave crystals with M.P. 104–107°.

Analysis.—Calcd. for $C_{17}H_{19}NO_5S$; C, 58.5; H, 5.49; N, 4.01. Found: C, 58.6; H, 5.38; N, 3.94.

To a stirred slurry of 2.2 g. of lithium aluminum hydride in 150 ml. of tetrahydrofuran was added a solution of 17 g. of N-methyl-N-[α-(carbomethoxy)benzyl]-p-methoxybenzenesulfonamide in 80 ml. of tetrahydrofuran at a rate such that the temperature did not exceed 30°. After stirring at room temperature for 2.5 hours the mixture was cooled, treated with 15 ml. of water, stirred for 20 min. at room temperature and filtered. The filtrate was dried with Drierite®, evaporated *in vacuo* to an oil which on treatment with ether-hexane gave 12.7 g. of crystals of N - methyl-N-(β-hydroxy-α-phenyl ethyl)-*p*-methoxybenzenesulfonamide, M.P. 94–98°. Recrystallization from ether-hexane raised the M.P. to 97–99°.

*Analysis.*—Calcd. for $C_{16}H_{19}NO_4S$: C, 59.9; H, 5.96; N, 4.36. Found: C, 59.3; H, 5.78; N, 4.13.

To a stirred solution of 12 g. of N-methyl-N-(β-hydroxy-α-phenyl ethyl)-*p* - methoxybenzenesulfonamide in 70 ml. of pyridine was added a solution of 18 g. of *p*-toluenesulfonyl chloride in 80 ml. of pyridine. The temperature rose to 30° during the addition. The solution was heated to 40° and then stirred overnight at room temperature. The solution was cooled to 10°, treated with a few pieces of ice, and after 10 min. poured into a mixture of ice and hydrochloric acid. The gummy precipitate was dissolved in benzene, washed twice with water, dried, and evaporated *in vacuo* to 20.3 g. of N-methyl-N-[β-(p-toluenesulfonoxy)-α-phenyl ethyl] *p*-methoxybenzenesulfonamide as an oil.

A mixture of 20.3 g. of N-methyl-N-[β-(p-toluenesulfonoxy α - phenyl ethyl] - p - methoxybenzenesulfonamide, 125 ml. of ethanol, and 13 g. of potassium hydroxide was stirred at reflux under nitrogen for 2 hours. The mixture was cooled, diluted with cold water and filtered. The filter cake was washed well with water and recrystallized from methanol to give 8 g. of large crystals of N-methyl-N-(α-styryl)-*p*-methoxybenzenesulfonamide, M.P. 86.5–88.5°.

*Analysis.*—Calcd. for $C_{16}H_{17}NO_3S$: C, 63.4; H, 5.65; N, 4.63. Found: C, 63.1; H, 5.84; N, 4.73.

Example 25

A solution of 100 mg. of N-(*p*-dimethylaminophenyl)-N-(α-styryl)-*p*-toluenesulfonamide in acetone was coated on a piece of aluminum, the acetone was evaporated by warming, and the residual oil was seeded with a crystal and allowed to stand overnight to give a hard coating consisting of both crystalline and glassy material. Imagewise exposure in air to a Spectroline Model SCT-1 penlamp at a distance of 1 in. for 10 min. gave a dark yellow image in the exposed area.

The N - (*p*-dimethylaminophenyl)-N-(α-styryl)-*p*-toluenesulfonamide was prepared as follows: To a stirred slurry of 300 ml. of dimethylformamide and 8.75 g. of a 50% dispersion of sodium hydride in mineral oil was added 46.5 g. of N-(*p*-dimethylaminophenyl)-*p*-toluenesulfonamide (prepared by the reaction of *p*-toluenesulfonyl chloride with N,N - dimethyl-*p*-phenylenediamine). After one hour the mixture was cooled to 10° and treated with 76.6 g. of methyl α-bromophenyl acetate. The mixture was stirred for one hour at room temperature, poured into ice water and extracted with 600 ml. of benzene. The benzene extract was washed with water, 1% aqueous sodium hydride, twice with water, dried and evaporated to 100 g. of dark oil. The oil was washed three times with a mixture of ether/hexane and then dissolved in methanol from which crystallization occurred. Recrystallization from methanol gave 37.7 g. of N-(*p*-dimethylaminophenyl)-N-(α-carbomethoxybenzyl) - *p* - toluenesulfonamide, M.P. 114–119°.

*Analysis.*—Calcd. for $C_{24}H_{26}N_2SO_4$: C, 65.9; H, 5.99; N, 6.40. Found: C, 65.6; H, 5.98; N, 6.22.

To an ice-cooled, stirred slurry of 3.9 g. of lithium aluminum hydride and 250 ml. of tetrahydrofuran was added a solution of 37 g. of N-(*p*-dimethylaminophenyl)-N - (α-carbomethoxybenzyl)-*p*-toluenesulfonamide in 140 ml. of tetrahydrofuran, at a rate such that the temperature did not exceed 30–35°. After stirring for 1.5 hours the mixture was cooled and treated with 30 ml. of water. After stirring for 15 min. the mixture was filtered. The filtrate was dried and evaporated to 34.9 g. of solid. Recrystallization from methanol gave 23.7 g. of crystals of N-(*p*-dimethylaminophenyl)-N-(β-hydroxy - α - phenylethyl)-*p*-toluenesulfonamide, M.P. 192–195° (d.).

*Analysis.*—Calcd. for $C_{23}H_{26}N_2SO_3$: C, 67.4; H, 6.39; N, 6.83. Found: C, 67.4; H, 6.65; N, 6.72.

To a stirred solution of 15.3 g. of N-(*p*-dimethylaminophenyl)-N-(β-hydroxy-α-phenylethyl) - *p* - toluenesulfonamide in 110 ml. of pyridine was added 9.5 g. of *p*-toluenesulfonyl chloride. The resulting solution was heated to 37° and allowed to stand at ambient temperature overnight. The solution was then cooled in an ice bath, treated with a piece of ice and stirred for 10 min. The solution was poured into ice water and filtered. The gummy filter cake was dissolved in benzene, washed twice with water, dried and evaporated *in vacuo* to 22.3 g. of solid N-(*p*-dimethylaminophenyl)-N-(β - *p*-toluenesufonoxy-α-phenylethyl)-*p*-toluenesuflonamide.

A mixture of 22.3 g. of N-(*p*-dimethylaminophenyl)-N-(β-*p*-toluenesulfonoxy-α-phenylethyl) - *p* - toluenesulfonamide, 150 ml. of ethanol and 13 g. of potassium hydroxide was stirred at reflux for 2 hours, cooled, diluted with ice water and filtered. The filter cake was washed with water to give 13.8 g. of crystals of N-(*p*-dimethylaminophenyl)-N-(α-styryl) - *p* - toluenesulfonamide. The product was purified by recrystallizing from ethanol to give 10.8 g. of needles, M.P. 131.5–133.5°.

*Analysis.*—Calcd. for $C_{23}H_{24}N_2O_2S$: C, 70.4; H, 6.15; N, 7.14. Found: C, 70.1; H, 6.36; N, 6.94.

The ultraviolet spectrum of the product in ether shows an absorption shoulder at 2825 A. (ε 12,900).

Example 26

Crystals of N - (*p*-dimethylaminophenyl)-N-(α-styryl)-*p*-toluenesulfonamide were melted between microscope slides and allowed to cool to a glass. The slides were then pulled apart with the aid of a razor blade and the glassy coating on one slide was exposed in air for 2 min. at a distance of 1 in. to the lamp of Example 25 to give a yellow image.

Example 27

A crystal of N-(*p*-dimethylaminophenyl)-N-(α-styryl)-*p*-toluenesulfonamide was partly covered with a piece of aluminum and exposed in air at a distance of 1 in. for 6 min. to the lamp of Example 25. The exposed portion of the crystal became yellow while the unexposed portion remained colorless.

Example 28

A scattering of crystals of N - (*p* - methoxyphenyl)-N-(α-styryl)-*p*-toluenesulfonamide on a microscope slide was partly covered with a piece of aluminum and exposed in air to a high pressure mercury lamp using a Corning 9–54 filter at a distance of 12 in. for 90 min. The exposed crystals had become pale yellow in color and the unexposed crystals remained colorless.

Example 29

A solution was prepared by dissolving 50 mg. of N-ethyl-N-2-propenyl-*p*-toluenesulfonamide and 50 mg. of benzoin methyl ether in 2 ml. of a 5% solution of cellulose acetate butyrate in acetone. One ml. of the solution was coated on a glass slide, allowed to dry and exposed under nitrogen through a negative at 366 mµ. (approximately 7 µw./cm.²) for 5 min. The coating was dipped in a solution of picric acid in ether and rinsed with ether to give a deep yellow negative image.

The N-ethyl-N-propenyl-*p*-toluenesulfonamide was prepared as follows: To a stirred slurry of 40 g. of lithium aluminum hydride in 750 ml. of tetrahydrofuran was added a solution of 110 g. of 2-acetamidopropyl acetate (prepared by the reaction of acetic hydride with 2-amino-1-propanol) in 250 ml. of tetrahydrofuran at a rate such that gentle reflux was maintained. Stirring at reflux was continued for 9 hours. The mixture was cooled in ice, treated with 100 ml. of water, stirred for 1.5 hours and filtered. The filtrate was dried with Drierite® and evaporated *in vacuo* to 54.2 g. of liquid. Distillation gave 34.2 g. of N-ethyl-N-β-hydroxy-isopropylamine, B.P. 60–67°/ 7–38 ml.

Analysis.—Calcd. for $C_5H_{13}NO$: C, 58.2; H, 12.7, N, 13.6. Found: C, 58.6; H, 12.7; N, 13.5.

To a stirred solution of 15.2 g. of N-ethyl-N-β-hydroxy-isopropylamine in 300 ml. of pyridine was added a solution of 89 g. of p-toluenesulfonyl chloride in 250 ml. of pyridine at a rate such that the temperature remained at 40–45°. After stirring overnight at room temperature the solution was cooled to 10°, treated with a few pieces of ice. and after 20 min. poured into excess ice and hydrochloric acid. The resulting gum was collected by decantation, dissolved in ether, washed with dilute hydrochloric acid and water, dried and evaporated to 28.6 g. of amber oil. Recrystallization from ether-hexane gave 18.2 g. of crystals of N-ethyl-N-(3-p-toluenesulfonoxy-2-propyl)-p-toluenesulfonamide.

A mixture of 14 g. of potassium-t-butoxide, 100 ml. of t-butyl alcohol and 17 g. of N-ethyl-N-(3-p-toluenesulfonoxy-2-propyl)-p-toluenesulfonamide was stirred at reflux under nitrogen for 1 hour, cooled, diluted with ice water and extracted with ether. The ether extract was washed twice with water, dried and evaporated to a crystalline residue. Recrystallization from heptane gave 6.8 g. of crystals of N-ethyl-N-propenyl-p-toluenesulfonamide, M.P. 64.5–68°.

Analysis.—Calcd. for $C_{12}H_{17}NO_2S$: C, 60.4; H, 7.15; N, 5.86. Found: C, 60.0; H, 7.28; N, 5.40.

Example 30

A solution was prepared by dissolving 100 mg. of N-(p-dimethylaminophenyl)-N-(α-styryl) - p - toluenesulfonamide and 100 mg. of benzoin methyl ether in 2 ml. of a 5% solution of cellulose acetate butyrate in acetone. One ml. of the solution was coated on a microscope slide and allowed to stand for a few minutes. While the coating was still tacky it was covered with a second microscope slide and exposed imagewise at 366 mμ (~100 μw./cm.²) for 15.25 hours. The coating was a deep orange color in the exposed areas and colorless in the unexposed areas.

The invention can also be practiced with compositions which are essentially crystalline.

Example 31

A solution was prepared by dissolving 214 mg. of 1,2-diphenoxyethane, 7 mg. of 2-o-chlorophenyl-4,5-di(m-methoxyphenyl)imidazole dimer, 1 mg. of 2-mercaptobenzoxazole, 2 mg. of Michler's ketone, 15 mg. of Polyox WSRN-10 (a commercial polyethylene oxide of Union Carbide Corp.). and 10 mg. of N-ethyl-N-propenyl-p-toluenesulfonamide in 8 ml. of chloroform. Two ml. of the solution was coated on a 2 x 3 inch piece of aluminum and warmed under a heat lamp until the solvent had evaporated. The crystalline coating was briefly remelted and allowed to crystallize. The coating was exposed through a Kodak 1A step tablet at 366 mμ (6.7 μw./cm.²) for four minutes in air. Development of the coating with an ether solution of $B_{12}H_{10}(CO)_2$ gave an image containing 4 steps.

The invention provides a method for the storage of information and can be used for the preparation of images suitable for projection. Subsequent development and transformation can give relief images for printing plates or embossing molds. By the formation of metal films on exposed surfaces, printed circuits can be obtained.

I claim:

1. A photoimaging composition consisting essentially of an N-vinylsulfonamide and about 0.1%–150% by weight based on the sulfonamide, of a free-radical generating system that absorbs light in the range of 2000–8000 A. with a molar extinction coefficient of at least 100 in the range of 3300–8000 A. consisting of one or more organic compounds selected from the group consisting of aromatic ketones and 2,4,5-triarylimidazole dimers, the generated free-radicals being capable of converting the said N-vinylsulfonamide to a β-sulfonylvinylamine, the N-vinylsulfonamide having the formula

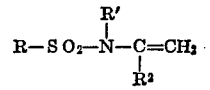

wherein

R, R' and R² are hydrocarbyl, halo- or hydrocarbyloxy, substituted hydrocarbyl of up to 12 carbon atoms in which any unsaturation is aromatic, with the proviso that R' can be dialkylamino substituted hydrocarbyl;
R² can be hydrogen; and
the sulfonamide has 4 to 30 carbons, up to 4 chlorine, fluorine. or bromine atoms, and up to 1 ether oxygen.

2. A composition according to claim 1 wherein the sulfonamide is N-methyl-N-(α-styryl)-p-toluenesulfonamide.

3. A composition according to claim 1 wherein the sulfonamide is N-methyl-N-(α-styryl)-p-bromobenzenesulfonamide.

4. A composition according to claim 1 wherein the sulfonamide is N-ethyl-N-2-propenyl-p-toluenesulfonamide.

5. A composition according to claim 1 wherein the free-radical generating system is a 2,4,5-triarylimidazole dimer.

6. A composition according to claim 1 containing N-methyl-N-(α-styryl)-p-toluenesulfonamide and 2-o-chlorophenyl-4,5-di(m-methoxyphenyl)imidazole dimer.

7. A composition according to claim 1 containing a binder.

8. The process of photoimaging comprising exposing imagewise a supported layer composition of claim 1 to light having a wavelength of 2000–8000 A.

9. The process of claim 8 wherein the image is developed by contacting the composition with a compound that forms a precipitate or a salt with the said composition.

References Cited

UNITED STATES PATENTS 2,959,617  11/1960  McKusick _____ 260—556 AR
3,658,542   4/1972  Henry et al. _____ 96—90 R RONALD H. SMITH, Primary Examiner W. H. LOUIE, Jr., Assistant Examiner U.S. Cl. X.R.

96—88, 48 QP, 90 R; 260—556 AR